United States Patent [19]

Balzer

[11] 4,146,102
[45] Mar. 27, 1979

[54] PRESSURE MODULATING CONTROL VALVE FOR STEERING SYSTEMS OR THE LIKE

[75] Inventor: David J. Balzer, East Peoria, Ill.

[73] Assignee: Caterpillar Tractor Co., Peoria, Ill.

[21] Appl. No.: 816,829

[22] Filed: Jul. 18, 1977

[51] Int. Cl.² .......................................... B62D 11/08
[52] U.S. Cl. ............................. 180/6.7; 192/13 R; 137/596; 137/625.68
[58] Field of Search ............... 180/6.7, 6.2; 192/13 R; 137/596, 625.68

[56] References Cited

U.S. PATENT DOCUMENTS

| | | | |
|---|---|---|---|
| 2,941,639 | 6/1960 | Christenson | 192/13 R |
| 3,173,339 | 5/1965 | Larsen | 91/391 R |
| 3,222,868 | 12/1965 | Stelzer | 188/345 X |
| 3,354,788 | 11/1967 | Garrison et al. | 91/373 |
| 3,374,846 | 3/1968 | Massone | 180/6.7 |
| 3,494,449 | 2/1970 | Umeda et al. | 192/13 R |
| 3,589,481 | 6/1971 | Motsch | 188/345 |

Primary Examiner—John A. Pekar
Attorney, Agent, or Firm—Phillips, Moore, Weissenberger, Lempio & Majestic

[57] ABSTRACT

Steering control valves selectively pressurize and vent fluid-actuated clutches and brakes of a crawler tractor steering system. Each control valve has an internal spool assembly, coupled to a foot pedal by a cable, which modulates brake pressure as a function of a pedal position and which establishes a maximum brake fluid pressure thereby eliminating the need for additional system components for such purposes. The control valves also provide a feedback fluid pressure, to resist pedal depression with a force proportional to the brake fluid pressure, enabling an operator to sense the degree of braking which is present at different degrees of pedal depression.

15 Claims, 5 Drawing Figures

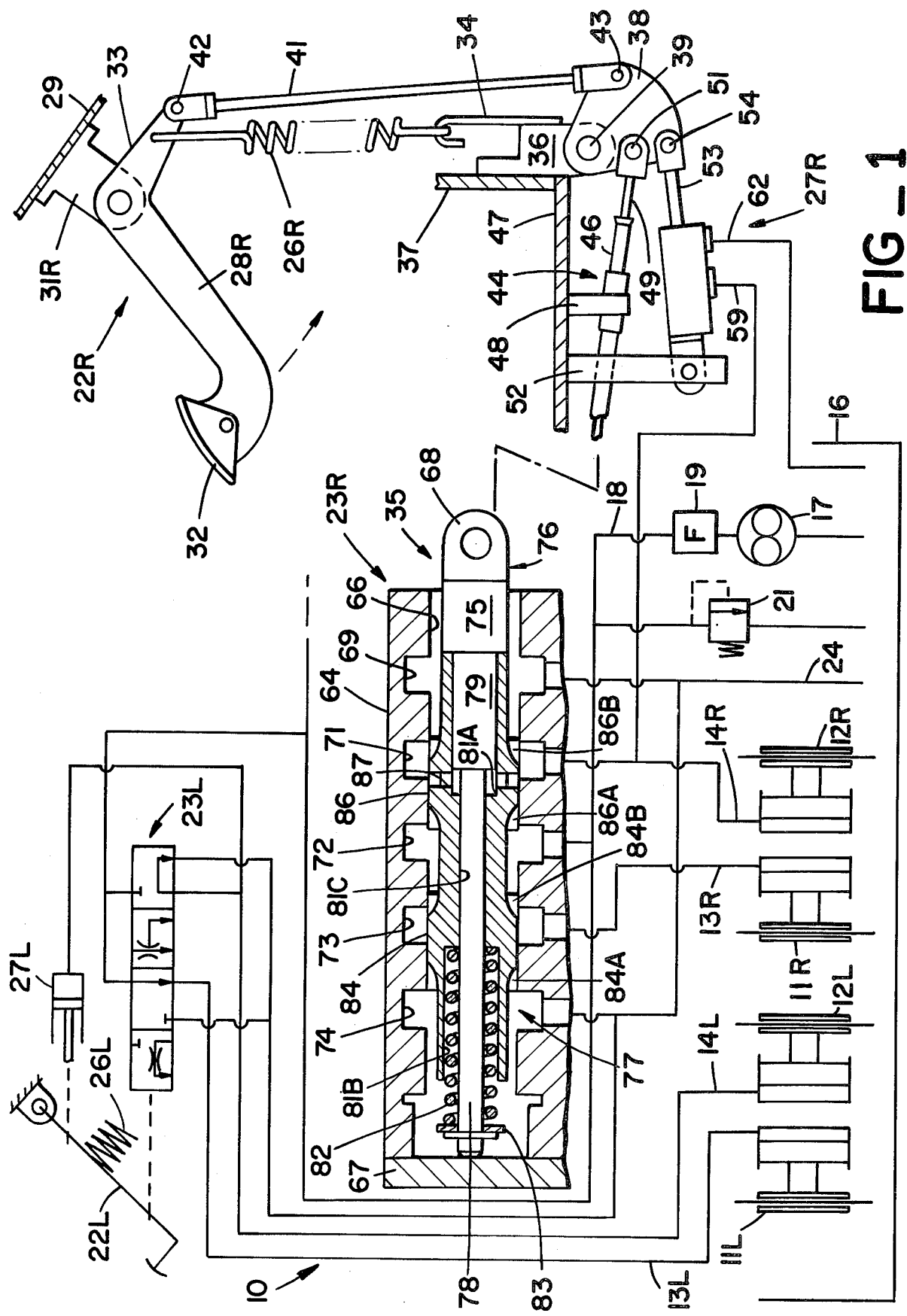
FIG_1

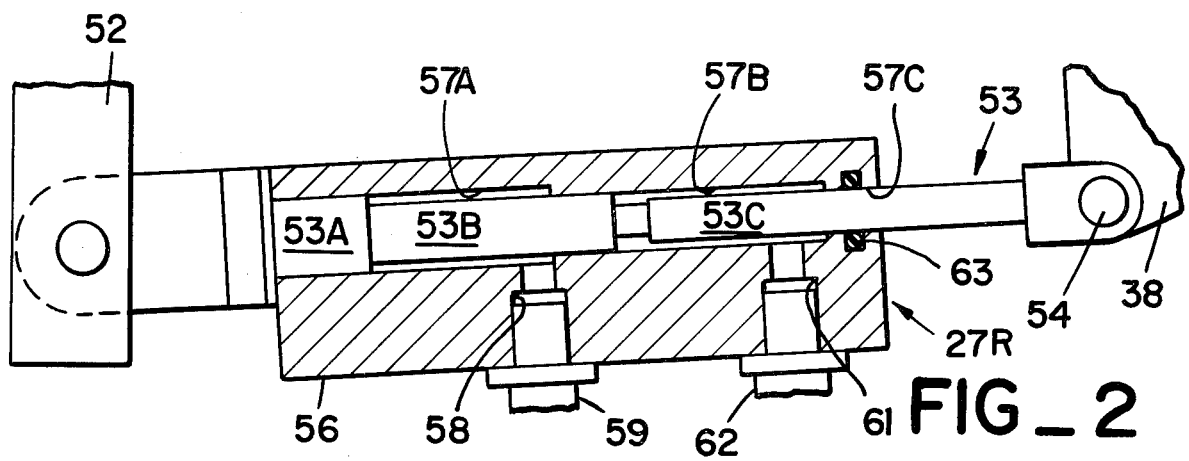
FIG_2
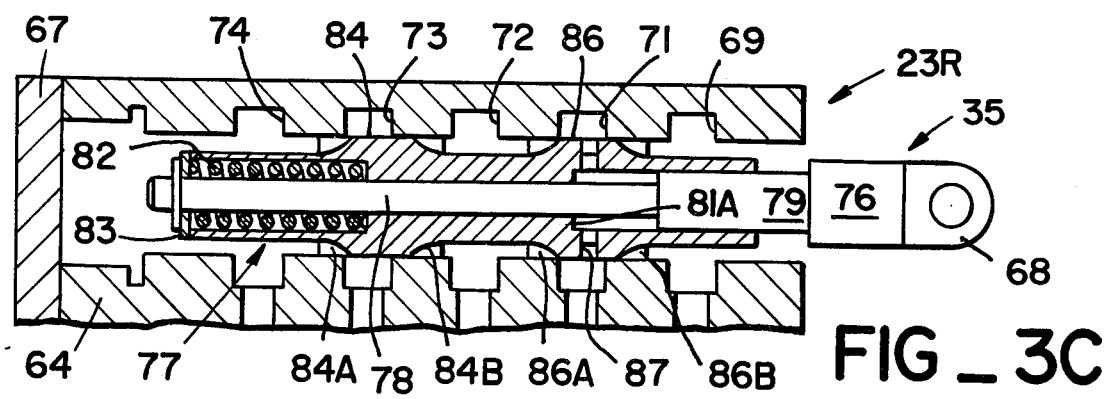
FIG_3C
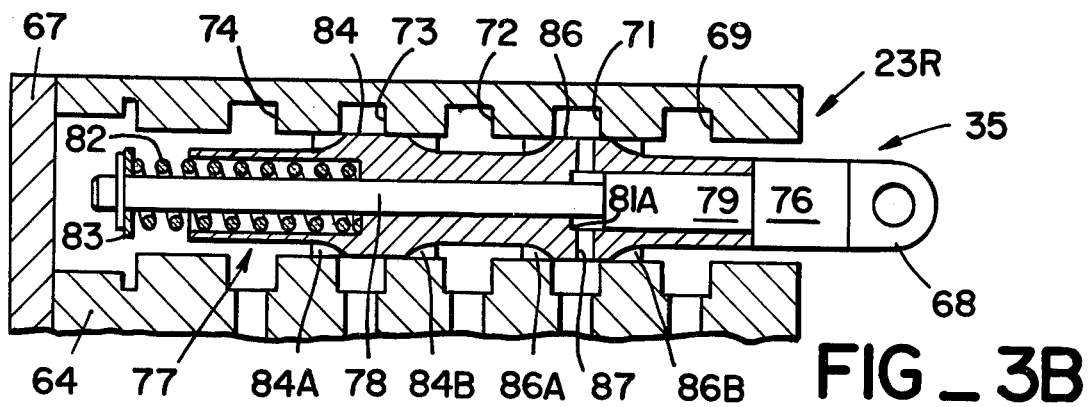
FIG_3B
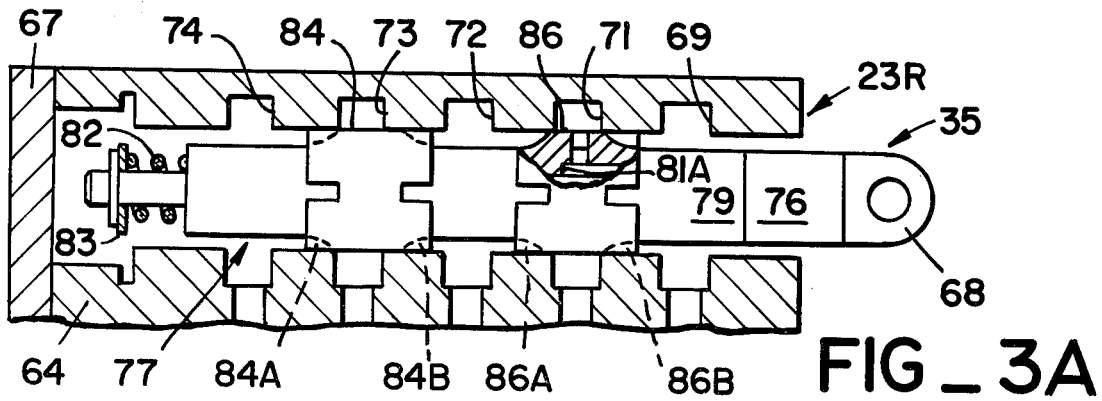
FIG_3A

PRESSURE MODULATING CONTROL VALVE FOR STEERING SYSTEMS OR THE LIKE

BACKGROUND OF THE INVENTION

This invention relates to spool valve constructions for selectively directing pressurized fluid to fluid-operated devices and in one specific form relates to fluid pressure-actuated steering systems as employed in crawler tractor vehicles or the like.

Fluid systems which have control valves for selectively directing pressurized fluid to fluid pressure-actuated devices are usually supplied with operating fluid by a pump and usually have means for establishing a maximum pressure for the system. The pressure-limiting means is typically a primary relief valve connected between the output of the pump and the fluid tank or reservoir. In many instances the pump supplies fluid to a number of different devices through a number of control valves and one or more of the devices may require pressures which are lower than that established by the primary relief valve at least at certain stages of operation. It may be necessary that the pressure supplied to a particular device be modulatable or selectable within a range of pressures and it may be necessary to establish an upper limit for the range of pressures, supplied to that particular device, that is lower than the maximum system pressure established by the primary relief valve.

Heretofore a substantial amount of system complication, in the form of component complexity or additional components, has been required to provide for selective pressure modulation and for establishing a secondary relatively low maximum pressure limit for one or more specific devices. Such complications add significantly to bulk and cost of the system and increase maintenance requirements. It is desirable that these factors be minimized to the extent possible in fluid systems.

A specific example of a fluid system subject to the foregoing requirements and problems is the fluid pressure-operated steering systems used on crawler vehicles such as crawler tractors or the like. In vehicles of this kind each track assembly receives drive through a fluid pressure-actuated clutch and each track assembly is also provided with a fluid pressure-actuated brake. Turning of the vehicle is accomplished by depressing one of two foot pedals or the like to operate a control valve which first disengages the clutch and then engages the brake at the appropriate one of the two track assemblies. The resulting reduction or elimination of drive at one track assembly relative to the other accompanied by a selected degree of braking shifts the direction of travel of the vehicle.

In some instances the steering clutch may require actuating fluid at higher pressure than does the brake. Further, the brake fluid pressure should be modulatable as a function of foot pedal position to enable the operator to control the degree of braking. The pump which supplies fluid to the steering control valves may also serve other devices on the vehicle in addition to steering clutches, such as a transmission for example, which require a higher maximum operating pressure than the steering brakes. Secondary relief valves have commonly been utilized at the flow path between each steering control valve and track assembly brake to provide the lower maximum brake fluid pressure.

A closely related requirement in crawler vehicle steering systems of the above-described kind may be present as a result of the fact that manipulation of the operator's steering pedal simply shifts the spool of a control valve rather than directly applying pressure to a brake, as in other forms of vehicle brake system, in a way which would allow the operator to feel the degree of braking force which exists at various pedal positions. Consequently it is highly desirable in the interest of precision steering and ease of control to provide a form of feedback which increasingly resists foot pedal movement, as pedal depression is increased, with a force which is proportional to the degree of braking which is occurring at each instant. The providing of feedback of this kind has heretofore required still further substantial system complications.

SUMMARY OF THE INVENTION

The present invention is directed to overcoming one or more of the problems as set forth above.

According to the present invention a control valve with shiftable internal spool means for selectively communicating at least one fluid-operated device with a source of pressurized fluid has a spool assembly which also enables selection of any desired output pressure within a range of pressures and which may also establish an upper limit for output pressure that is less than the system pressure which is supplied to the inlet of the control valve. Pressure control functions which have heretofore required substantial system complications are thus consolidated into the basic control valve.

In one specific form of the invention, control valves of this kind are utilized in a steering system for a crawler vehicle to control a clutch and brake at each track assembly under conditions where braking force is a precise function of the position of an operator's control pedal or the like and where the brakes may have maximum pressure limits less than the general system pressure applied to the control valves. The control valves further serve to generate directly an accurate feedback pressure which is applied to the operator's steering pedals or the like enabling the operator to sense the degree of braking which exists at each position of the foot pedal or the like.

The invention, together with further objects and advantages thereof, will best be understood by reference to the following description of a preferred embodiment taken in conjunction with the accompanying drawings.

BRIEF DESCRIPTION OF THE DRAWINGS

In the accompanying drawings:

FIG. 1 depicts the foot pedal-operated steering system of a crawler tractor wherein components of the system for controlling the left track assembly of the vehicle are shown symbolically and wherein certain portions of similar components for controlling the right-track assembly of the vehicle are shown in a more detailed mechanical form, FIG. 2 is an axial section view of a feedback cylinder shown in side elevation form in FIG. 1, and FIGS. 3A, 3B and 3C are axial section views of a steering control valve of the system of FIG. 1 illustrating successive positions of valve components at certain successive stages of operation.

DESCRIPTION OF A PREFERRED EMBODIMENT

Referring initially to FIG. 1 of the drawing, there is shown a steering system 10 for controlling the rightand left-track drive clutches 11R and 11L respectively and the right- and left-side track brakes 12R and 12L respectively of a crawler tractor or the like which may be of any of the known constructions. When traveling along a straight path clutches 11L and 11R are maintained in the engaged condition by fluid pressure received through control lines 13L and 13R respectively while brakes 12L and 12R are both unengaged as the control lines 14L and 14R for brakes 12L and 12R are unpressurized at that time. In many instances, to provide for cooling and lubrication, both the clutches 11 and brakes 12 are wholly or partly submerged in housing structure which effectively constitutes a portion of the fluid reservoir 16 or tank that stores operating fluid, such as oil for example, for various fluid-operated components of the vehicle.

Pressurized fluid for controlling the clutches and brakes as well as other devices on the vehicle is generated by a pump 17 which draws fluid from reservoir 16 and discharges fluid under pressure to a high-pressure line 18 through a filter 19. To establish a maximum system pressure limit, a primary relief valve 21 is connected between high-pressure line 18 and reservoir 16, the primary relief valve being of any suitable known form which releases fluid from high-pressure line 18 back to the reservoir to the extent needed to prevent the system pressure from exceeding a predetermined limit.

A left turn of the vehicle is initiated by depressing a pivoting foot pedal 22L in this example although a hand lever or other operator's steering control member may also be utilized for the same purpose. Depression of foot pedal 22L operates a left steering control valve 23L which is connected between high-pressure line 18 and control lines 13L and 14L for the left-side clutch 11L and left-side brake 12L respectively.

At the unoperated position of pedal 22L, control valve 23L communicates high-pressure line 18 with clutch control line 13L to maintain the clutch engaged and communicates the left brake control line 14L with a return line 24 to reservoir 16 to maintain the left brake disengaged. The initial movement of left sterring pedal 22L shifts left steering control valve 23L to effect a metered release of pressure from clutch control line 13L to return line 24 to progressively disengage the clutch in a modulated manner. The resulting decrease of drive at the left side of the vehicle may be sufficient in itself to effect a small degree of left turning of the vehicle. Where a more abrupt left turn is desired, further depression of the pedal 22L then begins to apply the left brake 12R in a modulated or progressively increasing manner by applying a progressively increasing fluid pressure to control line 14L through control valve 23L. Maximum depression of the pedal 22L establishes a condition where clutch 11L is fully vented to reservoir 16 through control line 13L and a predetermined maximum brake fluid pressure is applied to brake 12L through line 14L.

It is a common characteristic of crawler vehicle steering systems that the maximum brake fluid pressure which is to be applied to a brake 12L should be less than the maximum system pressure present in line 18 which also typically supplies various other fluid pressure-operated devices on the vehicle some of which require a higher operating pressure than the brake. In a typical crawler tractor vehicle for which the invention was designed, primary relief valve 21 maintains a maximum pressure of 1000 pounds per square inch (6895 kPa) in high-pressure supply line 18 but the brakes 12 of the steering system are fully applied at a brake fluid pressure of 399 pounds per square inch (2751 kPa) and this brake fluid pressure should not be exceeded in the brake system. The foregoing specific pressure values are given for purposes of example only and should not be considered limiting. Heretofore, a common practice has been to use additional secondary relief valves between brake control line 14L and the reservoir to assure that the lower maximum limit for brake pressure is not exceeded. In the present invention this function is provided for by the internal construction of the control valve 23L as will hereinafter be described in connection with the similar control valve 23R associated with the right-turn foot pedal 22R.

Thus depression of the left steering pedal 22L simply shifts a control valve 23L rather than applying direct braking force to brake 12L. Consequently, resistance of the pedal to the operator's foot movement does not inherently vary as a function of the amount of braking force which is actually being exerted at brake 12L as occurs in other forms of vehicle braking system. Unless this effect is compensated for, smoothness and precision in steering of the vehicle is very difficult since the operator cannot sense the amount of braking he is establishing at any given moment. Precise control of the degree and timing of turning motion of the vehicle is facilitated if the resistance to movement of the foot pedal 22L is made to increase in proportion to the magnitude of the braking force at brake 12L. Depression of the foot pedal 22L is resisted by spring means 26L which can be arranged to progressively increase the resistance to pedal depression as a function of pedal position but at best this can only provide for sensing a rough approximation of the instantaneous magnitude of the actual braking force. In order to cause pedal resistance to accurately conform to the actual magnitude of braking, a feedback means 27L of the fluid cylinder and piston form is coupled to the pedal and is communicated with the brake control line 14L to exert a force, resisting depression of the pedal, which is proportional to the instantaneous fluid pressure being delivered to the brake 12L. Thus as pedal 22L is progressively depressed to effect a modulating rise of brake fluid pressure at brake 12L, the resistance to such pedal movement also rises in proportion to the braking force and the operator is readily able to sense the degree of braking which exists at each position of the pedal.

Components of the right-turn control side of the system, some of which are depicted in greater mechanical detail in FIG. 1, are essentially similar to the left-turn components as described above except insofar as clutch control line 13R from the right sterring control valve 23R is communicated with the right-track assembly drive clutch 11R and brake control line 14R from the right steering control valve is communicated with the right-track assembly brake 12R and except insofar as the right feedback cylinder 27R opposes depression of the right steering pedal 22R instead of the left steering pedal and is responsive to the fluid pressure in control line 14R rather than control line 14L.

Considering the construction of certain of the above-described components of the steering system in more detail, right steering pedal 22R may consist of a lever 28R coupled to stationary structure 29 of the operator's compartment of the vehicle through a pivot 31 for downward and forward pivoting motion by the operator's foot and may have a foot pad 32 at the end remote from the pivot. Pedal lever 28 has an angled crank arm extension 33 extending forward and downward from pivot 31 and the spring 26R which biases the pedal towards the unoperated position may be connected between crank arm 33 and a strap 34 secured to a bracket 36 which is itself secured to a front panel member 37 of the operator's compartment below the pivot 31. To transmit pedal motion to the spool assembly 35 of steering control valve 23R, a pivotable member 38 is coupled to bracket 36 by a pivot joint 39 having a pivot axis parallel to that of the pedal mounting pivot 31. A link 41 is coupled to pedal crank arm 33 by a pivotable fastener 42 and to member 38 by another pivot fastener 43 to cause member 38 to be pivoted forwardly upon depression of the steering pedal 22R.

Suitable motion-transmitting means 44 translates the pivoting movements of member 38 to the spool assembly 35 of steering control valve 23R. The motion-transmitting means 44 in this example is of the flexible sheathed cable form having an outer sleeve 46 fixed to the floor 47 of the operator's compartment by a bracket 48 and which contains an axially slidable cable 49 coupled at one end to spool assembly 35 and at the other end to member 38 by a pivotable fastener 51. This form of motion-transmitting means 44 is used in this particular example as the steering system was designed for a tractor of the form having a tiltable operator's cab structure in which the operator's compartment including the steering pedals 22R and 22L and associated linkage may be pivoted relative to the remainder of the vehicle and the flexibility of the sheathed cable means 44 accommodates to this motion. In instances where a fixed operator's compartment is used, inflexible motion-transmitting linkage may be substituted for the sheathed cable means 44.

Feedback cylinder 27R may have a head end pivotably coupled to floor 47 through another bracket 52 and has an axially movable rod 53 coupled to member 38 through a pivotable fastening 54. Referring now to FIG. 2, the feedback cylinder 27R may include a cylinder member 56 pivotably coupled to bracket 52 at the end remote from member 38 and having a bore 57 into which the rod 53 extends. Bore 57 is stepped and has a large-diameter section 57A at the head end, and an intermediate-diameter section 57B with the final section 57C of the bore which is closest to member 38 being of smaller diameter. Rod 53 has a piston enlargement 53A at the end remote from member 38 which conforms in diameter with bore section 57A but which is of shorter axial length, followed by an intermediate-diameter section 53B which conforms in diameter with intermediate bore section 57B and extends into the intermediate bore section and still another section 53C which extends out through bore section 57C and conforms in diameter with that bore section. A braking fluid passage 58 in cylinder member 56 communicates a fluid feedback signal conduit 59 with bore section 57A and a leakage drain passage 61 in cylinder member 56 communicates a drain conduit 62 with intermediate bore section 57B. Thus high-pressure fluid admitted to bore section 57A through feedback signal conduit 59 exerts a force against piston enlargement 53A of the rod which tends to retract the cylinder 27R and to resist depression of the associated steering pedal as hereinbefore described. Any fluid which may leak along the passage 57 into bore section 57B is transmitted to drain conduit 62 through passage 61, an annular resilient seal 63 being disposed around rod 53 in the smaller bore section 57C to assure that such leakage fluid is diverted to drain conduit 62 rather than escaping from the rod end of the cylinder. Feedback signal conduit 59 and drain conduit 62 are respectively communicated with right brake control line 14R and reservoir 16 as may be seen by reference to FIG. 1.

Referring now again to FIG. 1, much of the hereinbefore-described advantages of the invention derive from the specialized internal construction of the steering control valves 23L and 23R which, in addition to providing the primary functions of actuating and deactuating the steering clutches and brakes, also function to modulate the application of fluid pressure to the brakes so that braking force is a function of pedal position and to establish a lower pressure limit for fluid applied to the brakes than the general system pressure limit which is established by relief valve 21. The internal construction for the control valve which effects these results is depicted in FIG. 1 for the right steering control valve 23R and it should be understood that the left steering control valve 23L shown symbolically in FIG. 1 may also have the same internal construction.

Right steering control valve 23R in this example includes a valve housing 64 transpierced by a bore 66 which is closed at one end by an end plate 67 and open at the opposite end from which a tang 68 of spool assembly 35 extends to connect with the previously described control cable cable 49. Five annular grooves 69, 71, 72, 73 and 74 are formed within housing 64 in coaxial relationship with the bore 66 and in communication therewith, the grooves being spaced apart and being progressively more distant from the open end of the bore. High-pressure supply line 18 is communicated with the central one of the grooves 72. The two grooves 69 and 74 at each end of the series of grooves are first and second drain grooves communicated with return line 74 to reservoir 16. Groove 71 communicates with brake control line 14R while groove 73 communicates with clutch control line 13R.

Spool assembly 35 includes an inner spool or position selector member 76 and a sleeve or flow-regulating member 77 which is coaxial with the position selector member and axially movable relative thereto as will hereinafter be described in more detail. Position selector member 76 has a first portion 75 adjacent tang 68 with a diameter somewhat less than that of bore 66 and has a relatively long opposite end portion 78 of substantially smaller diameter and an intermediate portion 79 of intermediate length and intermediate diameter. The flow-regulating sleeve member 77 has an axial bore 81 with a section 81A at one end into which intermediate portion 79 of position selector member 76 is received and which conforms in diameter with the intermediate portion 79 of the position selector member. The opposite end portion of the axial passage through flow-regulating member 77 is of larger diameter than position selector member portion 78 forming a spring chamber 81B in which a compression spring 82 is disposed to act between the flow-regulating member and a flange 83 on the end of portion 78 of the position selector member to urge member 77 away from flange 83. The intermediate portion 81C of the bore through flow-regulating member 77 conforms in diameter with position selector member portion 78.

Flow-regulating member 77 has an outer diameter less than that of housing bore 66 except at two spaced-apart annular land areas 84 and 86. With member 76 in the position depicted in FIG. 1 at which it abuts end plate 67 and with member 77 positioned, by spring 82, in abutting relationship against the shoulder formed by portion 75 of member 76 as also depicted in FIG. 1, land 84 is located to extend from one end of groove 74 through groove 73 and a short distance further towards groove 72. At the FIG. 1 position, land 86 is located to extend from a position slightly within groove 72 through groove 71. Axially directed metering grooves 84A are provided at the side of land 84 adjacent groove 74 while metering grooves 84B are situated at the opposite side of land 84 in position to communicate groove 73 with groove 72 at the above-described position of the valve components. Additional metering grooves 86A are provided at the side of land 86 adjacent to groove 72 and further metering grooves 86B are provided at the opposite side of land 86 and communicate groove 71 with groove 69 at the above-described position of the valve components.

Small radially directed flow passages 87 are provided within flow-regulating member 77 to communicate the outer surface of land 86 with bore section 81A and are located to be in partial communication with groove 71 at the above-described position of the valve components.

Considering now the operation of the control valve 23R, the above-described position of the valve spool assembly 35 components as depicted in FIG. 1 is the position which exists when right steering pedal 32 is at its uppermost or unoperated position. Spring 26R of the pedal linkage and the internal spring 82 of the control valve cause the elements of the spool assembly 35 to assume this position under that condition. At that position, and assuming that the vehicle has been started up and pump 17 is operating, clutch 11R is pressurized and therefore is engaged while brake 12R is vented to the reservoir and is therefore disengaged. These conditions exist since high-pressure supply line 18 is communicated with clutch 11R through groove 72, metering slots 84B, groove 73 and control line 13R. Control line 14R of the right brake is vented to reservoir 16 through groove 71, metering slots 86B, groove 69 and return line 24.

As the operator begins to depress the right steering pedal 22R, the initial portion of such movement brings spool assembly 35 to the position depicted in FIG. 3A at which the control valve begins to vent clutch control line 13R and at which time the brake control line 14R remains vented so that in effect the initial portion of the pedal movement brings about a gradual disengagement of the right-side clutch. These conditions are present at that time since, as may be seen in FIG. 3A, metering slots 84A have moved to a position where groove 73 is beginning to be communicated with drain groove 74 and will continue to be vented through an increasingly larger flow path provided by the tapering metering groove as spool movement continues. At this point communication between drain groove 71 which supplies the brake control line 14R has been terminated as metering grooves 86B no longer extend into groove 71. However, slight further travel of the valve spool assembly 35 is necessary before metering grooves 86A can begin to supply high-pressure fluid from groove 72 to groove 71.

Still further depression of the brake pedal 22R shifts the spool assembly 35 to the second position depicted in FIG. 3B at which the clutch 11R is vented and disengaged and actuation of brake 12R has commenced. Clutch 11R is disengaged since groove 73 remains in communication with drain groove 74 through metering grooves 84A. A modulated engagement of brake 12R has begun as groove 71, which supplies fluid to the brake, is beginning to be communicated with high-pressure fluid inlet groove 72 through metering grooves 86A.

A maximum fluid pressure may then be applied to the brake 12R while clutch 11R remains vented by further depression of the pedal 22R to bring valve spool assembly 35 to the third or extreme position depicted in FIG. 3C. At that extreme position the second outlet groove 73, which communicates with the clutch 11R, remains in communication with drain groove 74 through metering grooves 84A while the first outlet groove 71, which is communicated with the brake 12R, is communicated with high-pressure fluid inlet groove 72 through metering slots 86A to the very limited extent needed to compensate for leakage in order to maintain a predetermined maximum brake fluid pressure.

It should be observed that in passing from the FIG. 1 to the FIG. 3A position and in passing from the FIG. 3A position to the FIG. 3B position, the flow-regulating member 77 of the spool assembly travels as a unit with the position selector member 76. That does not necessarily occur during movement from the FIG. 3B to the FIG. 3C positions which is the portion of the movement at which the brake 12R is pressurized and engaged. Instead, there may be little if any movement of the flow-regulating member 77 in passing from the FIG. 3B to the FIG. 3C position, the movement at this stage normally being largely confined to the position selector member 76, which differential movement results in both a modulating function whereby the operator may select the degree of braking force by controlling the position of the foot pedal 22R and also results in a brake pressure-limiting effect under which the maximum brake pressure which can be applied to the brake 12R at the extreme degree of depression of the pedal 22R is less than the pressure which exists elsewhere in the system including in high-pressure fluid inlet groove 72 of the control valve.

This modulating and pressure-limiting function may best be understood by referring again to FIG. 1. It may be seen that the pressure within groove 71, which is the groove communicated with the brake 12R, is transmitted by passages 87 to bore section 81A of flow-regulating member 77 where such pressure reacts between the inner end surface of bore section 81A and the shoulder at the junction of portions 78 and 89 of spool member 76 and tends to urge member 77 along spool member 76 in the direction of flange 83. Such motion of the flow-regulating member 77 relative to the position selector member 76 is resisted by spring 82. Therefore the extent to which such motion actually occurs is dependent on the relative magnitudes of the brake fluid pressure within bore section 81A and the counterforce of spring 82.

During the initial stages of valve operation as depicted in FIGS. 1 and 3A and up until just prior to the stage depicted in FIG. 3B, brake groove 71 is vented to the reservoir as previously described and thus there is no significant fluid pressure in bore section 81A to act against the force of spring 82. Thus during this initial stage of valve operation, member 77 simply travels with member 76. As the position depicted in FIG. 3B is reached, pressurized fluid begins to be metered into groove 71 through metering slots 86A and therefore fluid pressure begins to build up in bore section 81A giving rise to a force proportional to brake fluid pressure that tends to shift member 77 along member 76 towards flange 83. If the operator stops spool assembly travel at the position depicted in FIG. 3B, a small fluid pressure builds up in groove 71 and in the brake 12R and such fluid pressure acting within bore section 81A then shifts member 77 against the force of spring 82 a slight distance to restrict the flow through metering slots 86A except for a possible small flow which may be needed to compensate for leakage. Thus at the FIG. 3B position, the control valve acts to limit brake fluid pressure, and therefore braking force, at a relatively low value.

If the operator then further depresses the pedal 22R, the pressure-limiting action described above continues except that a selectably higher brake fluid pressure limit is established dependent on the exact amount of such further pedal movement. This selectably higher brake fluid pressure is established since the further pedal movement necessarily travels position selector member 76 a further distance.

As flow-regulating member 77 does not travel at this time owing to the fluid pressure in bore section 81A which counteracts the force of spring 82 as described above, the spring is increasingly compressed during the further travel of the position selector member 76. As the spring force has been increased, the pressure-limiting action described above can now occur only after a higher pressure has been reached in groove 71 and bore section 81A to oppose the stronger spring force.

Accordingly, the operator can modulate or control the fluid pressure within the brake 12R by controlling the extent to which spool assembly 35 is traveled from the FIG. 3B position towards the FIG. 3C position. In a representative specific example of the invention, in which fluid pressure of 1000 pounds per square inch (6895 kPa) is provided in the high-pressure supply line 18, the operator may modulate brake fluid pressure at brake 12R to any selected value within the range of 48 psi to 399 psi (331 kPa to 2751 kPa) by regulating the extent to which he depresses the brake pedal 22R, it being understood that these specific values are not meant to be limitative of the invention as other ranges of brake pressure modulation may be realized by modifying the diameter of bore section 81A or the force characteristics of spring 82, or both.

It should be further observed that the operator is able to sense braking force from foot pedal 22R. As brake fluid pressure increases, feedback cylinder 27R acts in the previously described manner to supplement the force of spring 26R with an additional force which is proportional to the brake fluid pressure and which is therefore proportional to the degree of braking which exists at any instant. As the resistance to brake pedal movement is progressively increased in proportion to the degree of braking force, the operator is able to decrease braking force as necessary to effect a desired turn with ease and precision.

While the invention has been described with respect to a single exemplary embodiment it will be apparent that many modifications are possible and it is not intended to limit the invention except as defined in the following claims.

The embodiments of the invention in which an exclusive property or privilege is claimed are defined as follows:

1. A pressure reducing control valve for selectively delivering pressurized fluid from a fluid source to a fluid-operated device at any selected pressure level within a range of pressures, wherein the range of delivered pressures is limited to a maximum value which is less than the pressure of the fluid supplied to said control valve from the pressurized fluid source, comprising:
   a valve housing having a bore with a fluid inlet for receiving pressurized fluid from said source and with a spaced-apart first outlet for communication with said device,
   a spool assembly disposed in said bore for axial movement therein from a first position at which said first outlet is blocked from said inlet and a second position at which said first outlet is communicated therewith and being further movable for a selectable distance towards a third position to select an outlet pressure level within said range of pressures,
   said spool assembly having a position selector member movable axially in said bore from said first position to said second position and on toward said third position, and having a flow-regulating member movable axially within said bore relative to said selector member and having means for blocking said first outlet from said inlet at said first position of said spool assembly and for communicating said first outlet with said inlet at said second position thereof and during said further movement towards said third position,
   said spool assembly further having spring means for exerting an axially directed force between said selector member and said flow-regulating member in a direction which tends to move said flow-regulating member relative to said selector member to increase communication between said inlet and said first outlet when said spool assembly is between said second and third positions, and
   said spool assembly further having fluid pressure chamber means communicating with said first outlet for exerting an axially directed force between said selector member and said flow-regulating member which is opposed to the force of said spring means and which is proportional to the fluid pressure in said first outlet and which has a magnitude sufficient to block communication between said inlet and said first oulet when the pressure at said first outlet reaches said maximum value of said range.

2. A control valve as defined in claim 1 wherein said bore of said housing is further provided with a first drain passage spaced apart from said inlet and said first outlet, and wherein said flow-regulating member has means for communicating said first outlet with said first drain passage when said spool assembly is at said first position thereof, and said bore of said housing has an additional outlet and an additional drain passage spaced apart from each other and from said inlet and said first outlet and said first drain passage and wherein said flow-regulating member has means for communicating said addditional outlet with said inlet at said first position of said spool assembly and for blocking communication between said additional outlet and said inlet while communicating said additional outlet with said additional drain passage when said spool assembly is moved away from said first position thereof.

3. A control valve as defined in claim 1 wherein said bore of said housing is further provided with a first drain passage spaced apart from said inlet and said first outlet, and wherein said flow-regulating member has means for communicating said first outlet with said first drain passage when said spool assembly is at said first position thereof, and wherein said means for communicating said first outlet with said first drain passage is an annular land on said flow-regulating member, said land having at least one metering groove providing a variable flow path between said inlet and said first outlet as a function of the axial position of said flow-regulating member in said bore after said spool assembly has reached said second position thereof.

4. A control valve as defined in claim 1 wherein said position selector member of said spool assembly is an inner spool element extending axially in said bore and said flow-regulating member of said spool assembly is a sleeve disposed coaxially on said selector member for movement therealong, said spring means being a compression spring disposed coaxially with respect to said selector member and said flow-regulating member and having one end reacting against said selector member and an opposite end reacting against said flow-regulating member.

5. A control valve as defined in claim 1 in further combination with a steering system for a crawler track vehicle, said steering system comprising:
   a fluid pressure-actuated track brake, said brake having a control fluid line communicated with said first outlet,
   an operator's steering control member selectively movable from a rest position to apply said brake, and
   linkage means coupling said steering control member to said position-selector member of said spool assembly for shifting said selector member axially in said bore a distance which is a function of the extent of movement of said steering control member away from said rest position thereof.

6. The combination defined in claim 5 further comprising fluid pressure-actuated feedback cylinder means for urging said operator's control member toward said rest position thereof, said feedback cylinder means having a fluid inlet port communicated with said first outlet of said control valve whereby the resistance to movement of said operator's control lever is caused to be a function of the fluid pressure being applied to said brake.

7. The combination defined in claim 5 wherein said pressurized fluid source comprises a pump for supplying fluid to said inlet through a pressurized fluid supply line, a primary relief valve communicated with said fluid supply line for establishing a predetermined maximum supply pressure limit therein and wherein said fluid pressure chamber means of said control valve is sized in relation to the force of said spring means to establish said lower predetermined maximum delivered pressure limit in said first outlet of said control valve.

8. A control valve for selectively supplying pressurized fluid to a fluid-operated device at any selected pressure level within a range of pressures, comprising:
   a valve housing having a bore with a fluid inlet for receiving pressurized fluid and with a spaced-apart first outlet for communication with said device,
   a spool assembly disposed in said bore for axial movement therein from a first position at which said first outlet is blocked from said inlet and a second position at which said first outlet is communicated therewith and being further movable for a selectable distance towards a third position to select an outlet pressure level within said range of pressures,
   said spool assembly having a position selector member movable axially in said bore from said first position to said second position and on toward said third position, and having a flow-regulating member movable axially within said bore relative to said selector member and having means for blocking said first outlet from said inlet at said first position of said spool assembly and for communicating said first outlet with said inlet at said second position thereof and during said further movement towards said third position,
   wherein said position selector member of said spool assembly is an inner spool element extending axially in said bore and said flow-regulating member of said spool assembly is a sleeve disposed coaxially on said selector member for movement therealong,
   said spool assembly further having spring means for exerting an axially directed force between said selector member and said flow-regulating member in a direction which tends to move said flow-regulating member relative to said selector member to increase communication between said inlet and said first outlet when said spool assembly is between said second and third positions,
   said spring means being a compression spring disposed coaxially with respect to said selector member and said flow-regulating member and having one end reacting against said selector member and an opposite end reacting against said fow-regulating member,
   said spool assembly further having fluid pressure chamber means communicating with said first outlet for exerting an axially directed force between said selector member and said fow-regulating member which is opposed to the force of said spring means and which has a magnitude proportional to the fluid pressure in said first outlet,
   wherein said selector member has an exterior annular step forming one end wall of said fluid chamber means and said flow-regulating member has an interior annular step forming an opposite end wall of said fluid chamber means.

9. A control valve as defined in claim 8 wherein said exterior annular step of said selector member and said interior annular step of said flow-regulating member are spaced apart to define the chamber of said fluid pressure chamber means, and wherein said flow-regulating member has at least one radially extending passage communicating said chamber with said first outlet.

10. A control valve for selectively supplying pressurized fluid to a fluid-operated device at any selected pressure level within a range of pressures, comprising:
   a valve housing having a bore with a fluid inlet for receiving pressurized fluid and with a spaced-apart first outlet for communication with said device,
   a spool assembly disposed in said bore for axial movement therein from a first position at which said first outlet is blocked from said inlet and a second position at which said first outlet is communicated therewith and being further movable for a selectable distance towards a third position to select an outlet pressure level within said range of pressures,
   said spool assembly having a position selector member movable axially in said bore from said first position to said second position and on toward said third position, and having a flow-regulating member movable axially within said bore relative to said selector member and having means for blocking said first outlet from said inlet at said first position of said spool assembly and for communicating said first outlet with said inlet at said second position thereof and during said further movement towards said third position, said spool assembly further having spring means for exerting an axially directed force between said selector member and said flow-regulating member in a direction which tends to move said flow-regulating member relative to said selector member to increase communication between said inlet and said first outlet when said spool assembly is between said second and third positions, said spool assembly further having fluid pressure chamber means communicating with said first outlet for exerting an axially directed force between said selector member and said flow-regulating member which is opposed to the force of said spring means and which has a magnitude proportional to the fluid pressure in said first outlet, wherein said selector member of said spool assembly is an inner spool member having first, second and third portions of successively greater diameter forming first and second exterior steps on said selector member, and wherein said flow-regulating member is a cylindrical sleeve disposed coaxially on said selector member and having an internal annular third step which defines said fluid pressure chamber means in conjunction with said first step of said selector member and wherein said spring means is a compression spring disposed coaxially on said selector member and exerting a force between said selector member and said flow-regulating member which urges said flow-regulating member into abutment with said second step of said selector member.

11. A steering system for a crawler vehicle of the form having a right-track brake and a right-track drive clutch and a left-track brake and a left-track drive clutch wherein said clutches and brakes are fluid pressure controlled and wherein said clutches require a higher maximum fluid pressure than is required by said brakes, comprising:

a source of pressurized fluid for producing fluid having a predetermined system pressure, right and left steering control valves each having a pressurized fluid inlet coupled to said source of fluid and each having a first outlet and an additional outlet and at least one drain passage, each of said right and left steering control valves having a valve housing with a bore therein and each having a spool assembly disposed in said bore thereof for axial movement therein between a first position at which said first outlet thereof is blocked from said inlet thereof and communicated with said drain passage thereof while said additional outlet thereof is communicated with said inlet thereof and being movable to a second position at which said first outlet thereof is blocked from said passage thereof and communicated with said inlet thereof while said addditional outlet thereof is blocked from said inlet thereof and communicated with said drain passage thereof, each of said spool assemblies being further movable for a selectable distance towards a third position to select a brake fluid pressure level from a range of brake fluid pressures which range of brake fluid pressures has a maximum brake fluid pressure that is less than said predetermined system pressure, said spool assembly of each of said valves having a position selector member movable in said bore thereof from said first position to said second position and on to said third position and having a flow-regulating member carried by said selector member and being movable relative thereto, each of said spool assemblies of each of said valves further having spring means for urging said flow-regulating member thereof in a direction which tends to increase communication between said inlet thereof and said first outlet thereof when said spool assembly is between said second and third positions, and each further having fluid pressure chamber means communicating with said first outlet thereof for exerting a fluid force between said selector member thereof and said flow-regulating member thereof in opposition to the force of said spring means thereof, with said fluid force being proportional to the fluid pressure at said first outlet thereof and having a magnitude sufficient to block communication between said inlet and said first outlet when the pressure at said first outlet reaches said maximum brake fluid pressure, flow conduit means for communicating said first outlets of said right and left steering control valves with said right-track brake and said left-track brake respectively and for communicating said additional outlets of said right and left steering control valves with said right-track drive clutch and said left-track drive clutch respectively, and right and left steering control members selectively and independently movable by an operator from rest positions to controllably apply said right and left brakes respectively, and linkage means coupling said right and left steering control members to said position selector members of said right and left steering control valves respectively.

12. The combination defined in claim 11 further comprising right and left fluid cylinder means for urging said right and left steering control members respectively toward said rest positions thereof, each of said fluid cylinder means having a fluid inlet port, and means communicating said inlet port of said right fluid cylinder means with said first outlet of said right steering control valve and communicating said inlet port of said left fluid cylinder means with said first outlet of said left steering control valve.

13. A control system for a pair of work elements, comprising:

a source of pressurized fluid of a first preselected maximum value, a valve assembly having an inlet port in fluid communication with said source, first and second work ports in individual fluid communication with respective ones of the pair of work elements, a control element movably disposed within said valve assembly for selectively controlling communication between said inlet port and either of said pair of work ports, and means on said control element operatively associated with said inlet port and said first work port in a first range of movement for selectively providing flow rate regulation of fluid flow up to said first preselected maximum pressure to one of the pair of work elements and including means communicating with said inlet port and said second work port in a second range of movement for selectively providing pressure regulation of fluid to the other of the pair of work elements up to a second preselected pressure less than said first preselected maximum pressure.

14. The control system of claim 13 including an input selector operatively associated with said control element manipulatable for regulating pressure to said work elements.

15. The control system of claim 14 including force transmitting means operatively associated with said input selector and being responsive to pressure at said second work port to feed back the force of such pressure acting on said transmitting means to said input selector.

* * * * *